(12) United States Patent
Gavrilov et al.

(10) Patent No.: US 11,433,318 B2
(45) Date of Patent: Sep. 6, 2022

(54) EVAPORATOR FILM FORMER

(71) Applicant: FEDERAL STATE UNITARY ENTERPRISE "MINING AND CHEMICAL COMBINE" (FSUE "MCC"), Krasnoyarsky krai Zheleznogorsk (RU)

(72) Inventors: Petr Mikhailovich Gavrilov, Krasnoyarsk krai Zheleznogorsk (RU); Igor Alexandrovich Merkulov, Krasnoyarsky krai Zheleznogorsk (RU); Boris Nikolayevich Barakov, Krasnoyarsky krai Zheleznogorsk (RU); Yuri Sergeyevich Ilyinykh, Krasnoyarsky krai Zheleznogorsk (RU); Alexandr Viktorovich Vasilyev, Krasnoyarsky krai Zheleznogorsk (RU); Denis Valeryevich Tikhomirov, Krasnoyarsky krai Zheleznogorsk (RU)

(73) Assignee: FEDERAL STATE UNITARY ENTERPRISE "MINING AND CHEMICAL COMBINE" (FSUE "MCC"), Krasnoyarsky krai Zheleznogorsk (RU)

( * ) Notice: Subject to any disclaimer, the term of this patent is extended or adjusted under 35 U.S.C. 154(b) by 621 days.

(21) Appl. No.: 16/321,799

(22) PCT Filed: Aug. 19, 2016

(86) PCT No.: PCT/RU2016/000559
§ 371 (c)(1),
(2) Date: Jan. 29, 2019

(87) PCT Pub. No.: WO2018/034586
PCT Pub. Date: Feb. 22, 2018

(65) Prior Publication Data
US 2021/0354046 A1 Nov. 18, 2021

(51) Int. Cl.
*B01D 1/06* (2006.01)
*B01D 1/00* (2006.01)
B01D 1/14 (2006.01)
*B01D 1/22* (2006.01)

(52) U.S. Cl.
CPC .......... *B01D 1/065* (2013.01); *B01D 1/0082* (2013.01); *B01D 1/14* (2013.01); *B01D 1/22* (2013.01)

(58) Field of Classification Search
CPC ......... B01D 1/0082; B01D 1/065; B01D 1/22
See application file for complete search history.

(56) References Cited

U.S. PATENT DOCUMENTS 3,412,778 A 11/1968 Witt
3,524,620 A 8/1970 Bernard
(Continued)

FOREIGN PATENT DOCUMENTS

CA 2863015 * 11/2013 ............... C02F 1/08
CA 2863015 1/2017
(Continued)

OTHER PUBLICATIONS

English machine translation of RU 2510287, obtained from WIPO. (Year: 2014).*

(Continued)

*Primary Examiner* — Renee Robinson
(74) *Attorney, Agent, or Firm* — Dentons US LLP

(57) ABSTRACT

Evaporators used in radiochemical production designed to evaporate highly active solutions and devices designed to create thin film in the heating chambers.
The film former contains a liner in the upper part of the heat exchange tube attached to the spindle of the bellows assembly of the evaporator lid. The liner is provided with a radiation-proof tip that is not wettable by liquid being evaporated. The tip is made of two conjugate cones: the (Continued)

upper back cone and lower right cone, with the lower cone having a cylindrical belt with protrusions on it designed to center the conical tip on the inner surface of the heat exchange tube. A cap is mounted movably on the liner, with grooves on the lower end of the cap along the entire perimeter.

The liner attached to the spindle is connected by fins with adjacent liners installed in heat exchange tubes.

4 Claims, 3 Drawing Sheets

(56) References Cited

U.S. PATENT DOCUMENTS

| | | |
|---|---|---|
| 5,971,061 A | 10/1999 | Li |
| 2015/0314216 A1 | 11/2015 | Khalatov et al. |

FOREIGN PATENT DOCUMENTS

| | | | | |
|---|---|---|---|---|
| JP | S558547 | 1/1980 | | |
| JP | 2008082584 | 4/2008 | | |
| JP | 2007309873 | 6/2009 | | |
| RU | 965439 | 10/1982 | | |
| RU | 2257932 | 8/2005 | | |
| RU | 2510287 | * 3/2014 | ............... | B01D 3/28 |

OTHER PUBLICATIONS

Europe Supplementary Search Report dated Mar. 12, 2020 for Application 16913582.9 filed Aug. 19, 2016 (8 pages).

International Search Report and Written Opinion dated May 11, 2017 for International Application PCT/RU2016/000559 filed Aug. 19, 2016 (5 pages).

* cited by examiner

EVAPORATOR FILM FORMER

CROSS-REFERENCE TO RELATED APPLICATIONS

This application is a US 371 Application from PCT/RU2016/000559 filed Aug. 19, 2016, the technical disclosures of which are hereby incorporated herein by reference.

FIELD OF THE INVENTION

The invention relates to nuclear energy industry, in particular to evaporators used in radiochemical production, which are designed to evaporate highly active solutions, and more specifically to devices designed to create thin film in the heating chambers (evaporators), and can also be used in chemical, petrochemical and other industries.

BACKGROUND OF THE INVENTION

A device for the distribution of fluid is known (U.S. Pat. No. 2,182,029, IPC$^7$B01D 1/22), which consists of a vertical hollow cylinder placed in the annular space between vertical cylindrical surfaces and secured by the upper end in a tube plate. The upper part of the vertical cylinder is equipped with an annular pocket to accept and discharge liquid. A series of holes of the same diameter are provided in the vertical cylinder and in the annular pocket along the whole circular length and at the same height to drain the liquid.

When the known device functions, the treated fluid flows along the tube sheet through the pocket and the rows of holes in the form of a thin film along the outer and inner surfaces of the vertical cylinder. The cylinder with the film flowing down along its surface is heated by heat radiated from the pipe and the body, which are, in turn, heated by a coolant.

The disadvantages of the known device is its applicability only for low-boiling liquids, in particular hydrogen fluoride. The quantity and diameter of the holes in the cylinder and pocket, which create the flowing thin film and which are determined for this liquid, may not be suitable to other liquids with higher density and viscosity.

Besides, the presence of stagnant zones in the pockets below their respective holes complicates deactivation should the radioactive solutions be evaporated.

A film former of a tubular nozzle of a film apparatus is known (U.S. Pat. No. 2,510,287, IPC$^7$ B01D 3/28, B01D 1/22) that is installed in the upper part of the pipes located between the upper and lower tube plates of the heat exchanger and made in the form of a liner that is bent around the end of the pipe, the flow area of which increases downwards along the length of the pipe. At the entrance of the liner of the film former, a cap is installed that covers the upper part of the liner; the cap is installed coaxially with the liner and with a gap relative to the tube plate and the upper part of the liner. There are holes in the top of the cap on the side surface. At least two annular depressions are made on the top of the liner.

A known film former functions as follows.

From the tube sheet, the treated fluid enters the liner inlet through the gap between it and the end of the cap. After that, the liquid flow enters sequentially the peripheral annular cavity, in which the flow pulsations are smoothed and the liquid is uniformly redistributed around the circumference and enters the remaining cavities, where a uniform and stable film of liquid is formed at the inlet to the pipe.

The known film former was adopted by the applicant as a prototype.

In the known film former, the film thickness depends on the volume of liquid entering the film former, which, in turn, depends on the height difference of the liquid layer on the tube plate and the upper end of the liner.

To obtain a stable flowing film in the known film former, a certain level of liquid shall be maintained on the tube sheet. When the liquid level on the tube plate changes, and also when the density and viscosity of the evaporated liquid changes, the thickness of the flowing film changes also, which can lead either to a jet outflow of liquid or to rupture of the thin film and reduction of the evaporation surface.

Besides, liners installed in the heat exchange tubes, protrude above the tube sheet, and this does not allow to completely drain the liquid from the tube plate and makes it difficult to deactivate the evaporator after evaporation of radioactive solutions.

SUMMARY OF THE INVENTION

The proposed device is designed for evaporation of highly active solutions.

The technical result consists in remote control of the film thickness of the liquid flowing through the heat exchange tubes.

To achieve this technical result in the known film former, which consists of the liner and cap installed in the upper part of the heat exchange tube placed between the tube plates in the evaporator housing with a lid, the liner is attached to the spindle of the bellows assembly, which is installed on the evaporator lid and can be with controlled remotely.

The liner is provided with a tip made of a radiation-proof material that is not wettable by liquid being evaporated. The tip is made of two conjugate cones: the upper back cone and lower right cone, with the lower cone being provided with a cylindrical belt with protrusions on it, which are designed to center the conical tip on the inner surface of the heat exchange tube. A cap is mounted movably on the liner, with grooves being made on the lower end of the cap along the entire perimeter.

In the particular case of design in the liner along its axis, there is a hole communicating with the space above the tube plate higher than the level of the evaporated liquid on it.

In another particular case of embodiment, the liner that is connected to the spindle of the bellows assembly is provided with fins to be connected with adjacent liners equipped with tips and caps.

In another particular case of the design, the remote control of the bellows assembly mounted on the evaporator lid may be performed by a manipulator or by connecting the bellows assembly to an actuator using a rod.

Due to the fact that the liner is attached to the spindle of the bellows assembly mounted on the evaporator lid and that it is possible to control it remotely, as well as due to the fact that the liner is equipped with a tip made of radiation-resistant material, the proposed device can be used for evaporation of highly active solutions.

Due to the fact that the liner has a tip that is made of a material that is not wetted by the evaporated liquid, the liquid passing through the gap between the tip and the heat exchange tube flows mainly along the heat exchange tube.

Due to the fact that the tip has an upper back cone, when the liner moves vertically, the gap between the back cone of the tip and the upper end of the heat exchange pipe can be changed and the amount of liquid flowing through the gap can be remotely controlled, and, consequently, the thickness of the liquid film with different density and viscosity that flows through the heat exchange tube can be remotely controlled.

Due to the presence of the lower right cone in the tip, the liquid that falls on it can be redirected to the heat exchange tube, and since the tip is made of a material that is not wetted by the treated liquid, nothing prevents such redirection and the formation of a stable film on the heat exchange tube.

Since the lower cone has a cylindrical band with protrusions that center the conical tip on the inner surface of the heat exchange pipe, a uniform gap is obtained both between the return cone of the tip and the end of the heat exchange pipe, and between the cylindrical band of the tip and the heat exchange pipe; and due to this, a uniform stable film is formed, which, after leaving the gap between the cylindrical band and the heat exchange tube, flows through the heat exchange tube Due to the fact that a movable cap is installed on the liner, at the lower end of which there are grooves along its entire perimeter, the lower end of the cap remains supported in the tube plate when the liner moves vertically in the film thickness control range. The grooves made along the entire perimeter of the cap allow smoothing the pulsations of the evaporated liquid after it passes through the grooves of the cap, ensuring its flow along the perimeter of the gap between the tip and the heat exchange tube. At the same time, further vertical movement of the liner upwards above the control range allows the lower end of the cap to be raised above the tube sheet, which facilitates deactivation of the tube plate and the proposed device.

Due to the fact that holes are made along the liner axis, which communicate with the space above the tube sheet higher than the level of the liquid to be evaporated on it, the secondary steam generated in the process of evaporation of the liquid can be removed from the evaporator.

The liner, which is connected to the spindle of the bellows assembly, is provided with fins, due to which it is connected to liners and caps installed in the upper part of the adjacent heat exchange tubes; thanks to this, the film thickness on several heat exchange tubes may be adjusted.

Due to the fact that the bellows assembly mounted on the evaporator lid is remotely controlled by a manipulator or from an actuator that is connected to the bellows assembly through a rod, the proposed device can be used for evaporation of highly active solutions.

BRIEF DESCRIPTION OF THE DRAWINGS

The invention is illustrated in the drawings represented in FIG. 1, FIG. 2 and FIG. 3.

DETAILED DESCRIPTION

Figure 1:
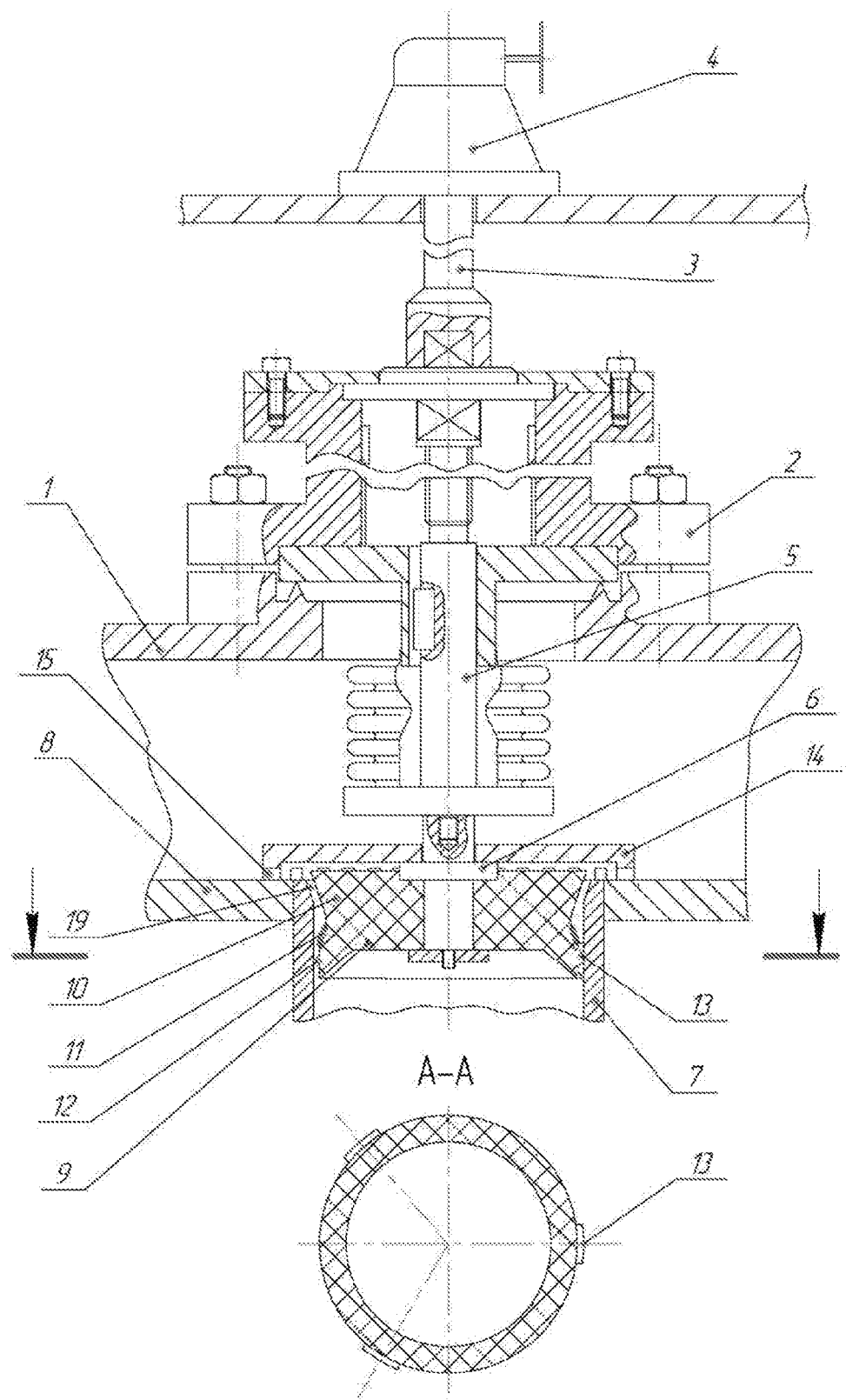
FIG. 1 shows the proposed film former with a joint output of the steamed off solution and secondary steam in the section.

The proposed film former (see FIG. 1) contains a bellows assembly 2 hermetically installed in the evaporator lid 1, which is used in bellows valves, and connected with actuator 4 through rod 3.

Spindle 5 of the bellows assembly 2 is connected with liner 6 that is mounted in the upper part of the heat exchange tube 7 attached to the tube plate 8. Liner 6 is provided with tip 9 made of a material that is not wettable by liquid being evaporated. When evaporating highly active solutions, tip 9 is made of radiation resistant material. Tip 9 is made in the form of two conjugate cones: the upper back cone 10 and the lower right cone 11. The lower cone 11 is provided with a cylindrical band 12 fitted with protrusions 13, which center tip 9 on the inner surface of the heat exchange tube 7. Cap 14 is mounted movably on liner 6, grooves 15 being made on the lower end of the cap along the entire perimeter.

Figure 2:
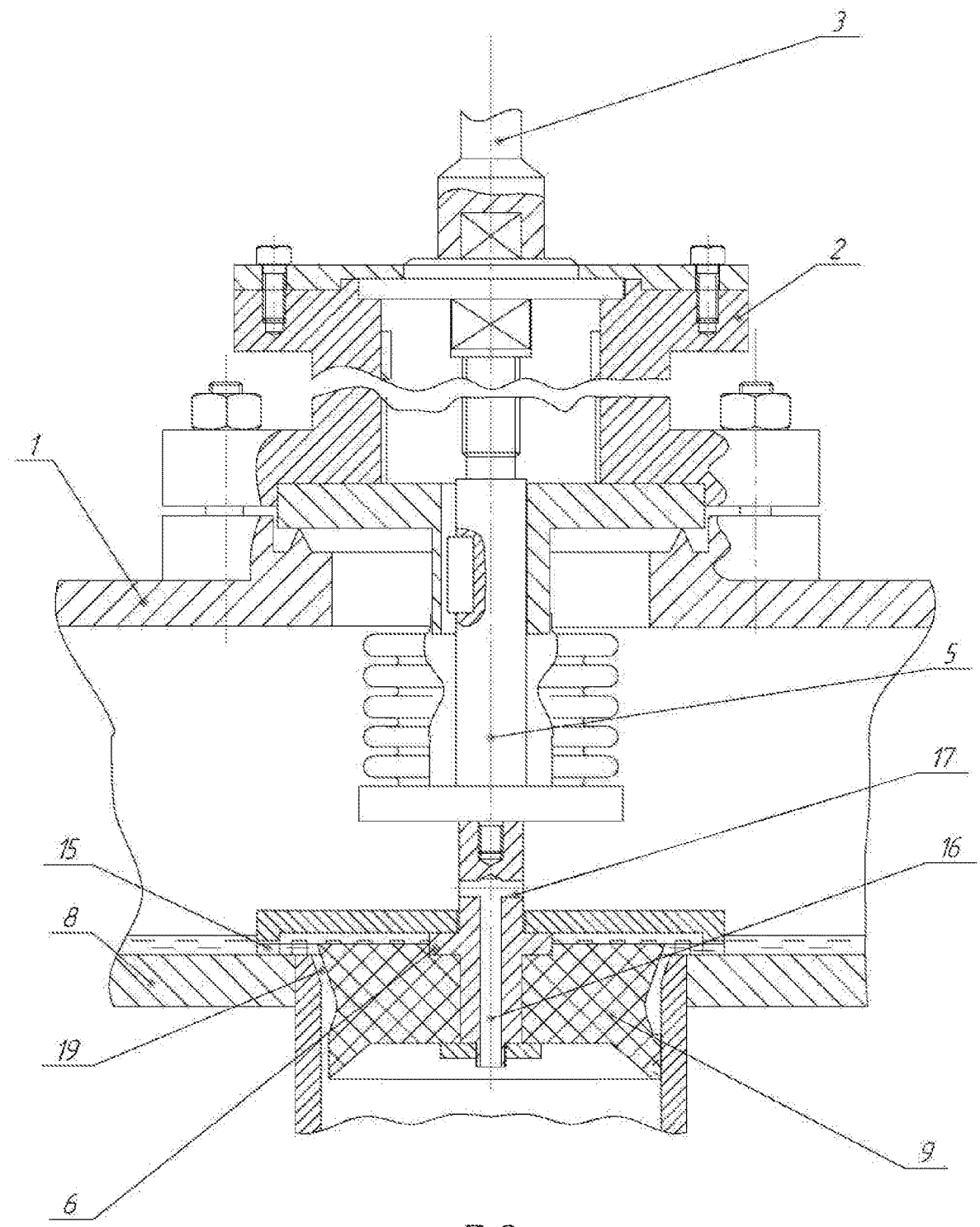
FIG. 2 shows the proposed film former in the section with a separate output of one steamed off solution and secondary steam in the section.

There may be hole 16 done in liner 6 (see FIG. 2), which is connected to radial holes 17 located above the level of the evaporated liquid on the tube plate 8.

Figure 3:
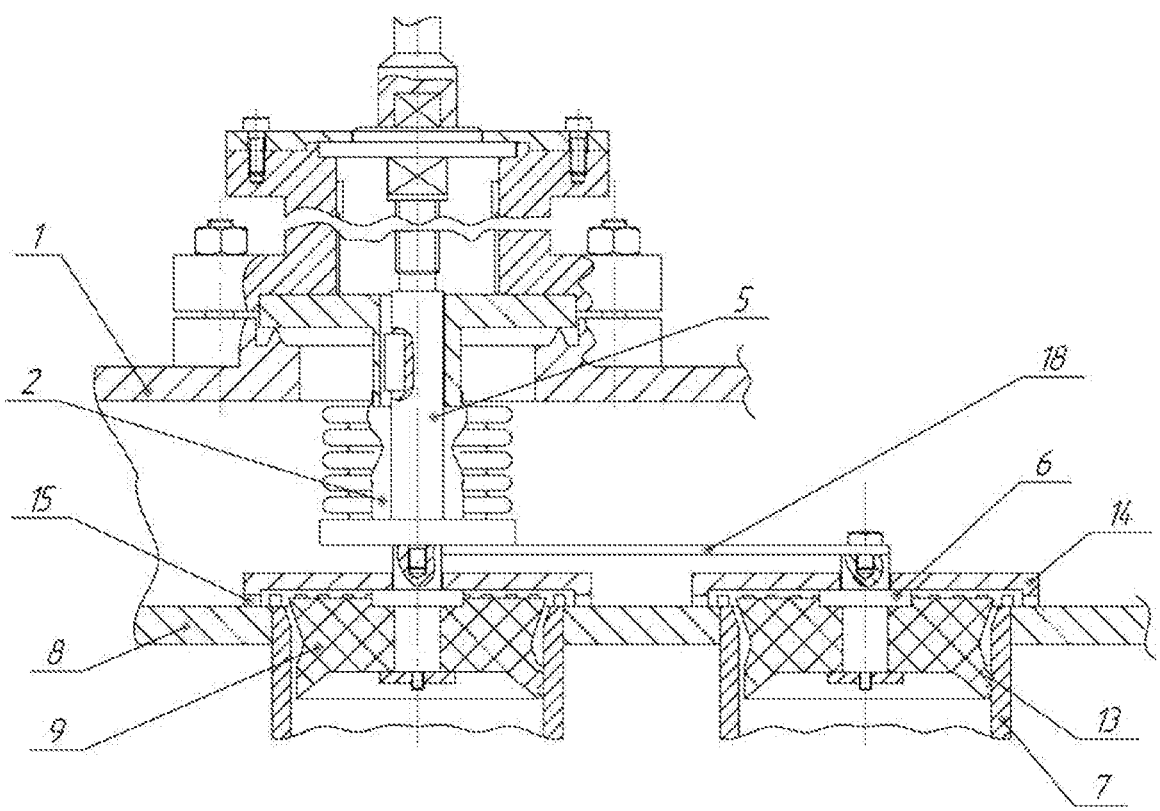
FIG. 3 shows the proposed film former with the regulation of the thickness of the film of liquid flowing through several heat exchange tubes.

By means of fins 18, liner 6 connected to spindle 5 of the bellows assembly 2 can be connected (see FIG. 3) with adjacent liners 6 equipped with tips 9. Adjustable gap 19 is formed between back cone 10 of tip 9 and the end of heat exchange tube 7.

When using the proposed device in the evaporator (remote heating chamber) used in conjunction with the separator (not shown in the drawings), the secondary steam and the steamed off solution enter the separator together and are separated there. In this case, holes 16 and 17 in liners 6 are not performed.

The claimed device operates as follows.

The evaporated liquid is supplied to the tube plate 8 and forms a layer of a certain height on it, the hydraulic pressure of which provides the flow of fluid through grooves 15 located along the perimeter of cap 14 into the annular gap between cap 14 and tip 9 of liner 6. This ensures uniform distribution of the fluid throughout the entire area of the annular gap between cap 14 and reverse cone 10 of tip 9. Then the liquid enters the adjustable gap 19 between the upper end of the heat exchange pipe 7 and the back cone 10 of tip 9. By moving spindle 5 of the bellows assembly 2 with the help of the manipulator (not shown) or actuator 4, the flow area of the adjustable gap 19 is changed and the flow rate of the fluid flowing through gap 19 is set to form a film that flows uniformly and stably through the heat exchange tube 7.

If a part of the liquid will flow down the back cone 10, then the lower right cone 11 will redirect it to the heat exchange tube 7. The liquid film flows then along the gap between the heat exchange tube 7 and the cylindrical band 12 of the right cone 11.

Film that flows in places of contact of the projections 13 with the heat exchange tube 7 will bend around them and close under the projections 13 due to the non-wettability of the material, which tip 9 is made of. The liquid gest evaporated intensively while flowing down as a film along the heat exchange tube 7. From the central part of the heat exchange pipe 7 through holes 16 and 17, the resulting secondary steam rises into the space under lid 1 above the level of the liquid on the tube plate 8 and is removed from the evaporator.

In the case of application for the separation of the steamed off solution and the separator's secondary steam, the steamed off solution and the resulting secondary steam from the evaporator are output together to it. In the vacuumized separator, the secondary steam is additionally released from the heated streamed off solution.

We claim:

1. An evaporator film former comprising:
a bellows assembly having a spindle, the bellows assembly configured to be installed on an evaporator lid of an evaporator;
a liner; and
a cap;
wherein the liner is configured to be installed in an upper part of a heat exchange tube located between portions of a tube plate in an evaporator housing of the evaporator, the evaporator housing being provided with the evaporator lid;
wherein the liner is attached to the spindle of the bellows assembly, the bellows assembly being remotely controllable, the liner being remotely controllable via remote control of the bellows assembly, and the liner comprising a tip made of radiation-resistant material configured not to be wetted by evaporated liquid;
the tip being made of two conjugate cones, the two conjugate cones comprising an upper inverted cone and a lower aright cone, the lower cone comprising a cylindrical band with projections, the projections being designed to center the tip along an inner surface of the heat exchange tube; and
the cap being a movable cap mounted on the liner, and the lower end of the cap comprising grooves along an entire perimeter of the cap.

2. The film former according to claim 1, wherein in the liner along a longitudinal axis of the liner, there is a hole communicating with a space above the tube plate, the space configured to be higher than a level of evaporated liquid on the tube plate.

3. The film former according to claim 1, comprising a plurality of liners and a plurality of caps, the plurality of liners comprising the liner and adjacent liners, and each cap in the plurality of caps being a respective cap for a respective liner of the plurality of liners, the respective cap being a movable cap mounted on the respective liner, and the lower end of the respective cap comprising grooves along an entire perimeter of the respective cap;
wherein the liner connected to the spindle of the bellows assembly is connected by fins with the adjacent liners, the adjacent liners configured to be installed respectively in adjacent heat exchange tubes, and each of the adjacent liners comprising a respective conical tip, the respective conical tip being made of two respective conjugate cones, the two respective conjugate cones comprising a respective upper inverted cone and a respective lower upright cone, the respective lower cone comprising a respective cylindrical band with respective projections, the respective projections being designed to center the respective conical tip along a respective inner surface of a respective heat exchange tube of the adjacent heat exchange tubes.

4. The film former according to claim 1, wherein the film former is configured so that the remote control of the bellows assembly mounted on the evaporator lid can be performed by a manipulator mechanism or by connecting the bellows assembly to an actuator using a rod.

* * * * *